United States Patent
Scheel et al.

(10) Patent No.: US 9,855,697 B2
(45) Date of Patent: Jan. 2, 2018

(54) WEARING BODY FOR RECEIVING A TWIN SCREW FOR EXTRUDING MELTABLE MATERIAL

(71) Applicant: KRAUSSMAFFEI BERSTORFF GMBH, Hannover (DE)

(72) Inventors: Gerhard Scheel, Hannover (DE); Michael Behling, Hameln (DE)

(73) Assignee: KRAUSSMAFFEI BERSTORFF GMBH, Hannover (DE)

( * ) Notice: Subject to any disclaimer, the term of this patent is extended or adjusted under 35 U.S.C. 154(b) by 0 days.

(21) Appl. No.: 15/023,920

(22) PCT Filed: Sep. 2, 2014

(86) PCT No.: PCT/EP2014/068557
§ 371 (c)(1),
(2) Date: Mar. 22, 2016

(87) PCT Pub. No.: WO2015/043888
PCT Pub. Date: Apr. 2, 2015

(65) Prior Publication Data
US 2016/0214304 A1  Jul. 28, 2016

(30) Foreign Application Priority Data
Sep. 26, 2013  (DE) .......................... 10 2013 110 671

(51) Int. Cl.
*B29C 47/66* (2006.01)
*B29C 47/08* (2006.01)
(Continued)

(52) U.S. Cl.
CPC ...... *B29C 47/0835* (2013.01); *B29C 47/0847* (2013.01); *B29C 47/40* (2013.01); *B29C 47/662* (2013.01); *B29L 2031/757* (2013.01)

(58) Field of Classification Search
CPC . B29C 47/0844; B29C 47/0803; B29C 47/38; B29C 47/60; B29C 47/0825;
(Continued)

(56) References Cited

U.S. PATENT DOCUMENTS 3,900,188 A * 8/1975 Seufert .................. B22D 19/00
366/145
3,970,113 A * 7/1976 Guttinger ............ B29C 47/0847
138/157
(Continued)

FOREIGN PATENT DOCUMENTS

CN        103144265       6/2013
DE        24 23 785       5/1974
(Continued)

OTHER PUBLICATIONS

International Search Report issued by the European Patent Office dated Nov. 5, 2014 in International Application PCT/EP2014/068557.
(Continued)

*Primary Examiner* — Charles Cooley
(74) *Attorney, Agent, or Firm* — Henry M. Feiereisen LLC

(57) ABSTRACT

A wearing body or bushing having an axial twin borehole for receiving a twin screw for extruding meltable material, in particular plastic. In order to avoid cracking and to save material, the wearing body has a radial cross section with an outer contour, which is convexly curved over the entire circumference and is in the form of an oval, and with first and second axes of symmetry, which run perpendicularly to one another and define a point of intersection which lies on the extrusion axis. The width of the oval on the first axis of symmetry is greater than the height of the oval on the second axis of symmetry.

11 Claims, 6 Drawing Sheets

(51) Int. Cl.
*B29C 47/40* (2006.01)
*B29L 31/00* (2006.01)

(58) Field of Classification Search
CPC . B29C 47/0835; B29C 47/0847; B29C 47/40; B29C 47/662; F16D 2001/103; F16D 1/101; Y10T 403/7026; Y10T 403/7035; Y10T 29/49252; B29L 2031/757
USPC .......... 403/359.1, 359.6; 29/888.023; 366/69
See application file for complete search history.

(56) References Cited

U.S. PATENT DOCUMENTS

| | | | | |
|---|---|---|---|---|
| 4,028,027 | A * | 6/1977 | Worz | B29C 47/0847 100/146 |
| 4,036,540 | A * | 7/1977 | Seufert | B29C 47/0847 366/83 |
| 5,110,284 | A | 5/1992 | Dienst et al. | |
| 5,116,135 | A * | 5/1992 | Kaiser | B22F 5/007 366/349 |
| 5,221,821 | A * | 6/1993 | Burns | B23K 15/006 219/121.14 |
| 5,223,345 | A * | 6/1993 | Kaiser | B22F 5/007 419/49 |
| 5,816,699 | A * | 10/1998 | Keith | B29C 47/662 366/84 |
| 6,463,643 | B1 | 10/2002 | Behling | |
| 6,805,480 | B1 * | 10/2004 | Behling | B29C 47/662 366/149 |
| 2002/0126573 | A1 * | 9/2002 | Schubert | B21C 37/0803 366/69 |
| 2004/0074092 | A1 * | 4/2004 | Behling | C21D 1/10 29/888.06 |
| 2006/0007776 | A1 * | 1/2006 | Zahradnik | B23P 15/00 366/69 |
| 2009/0016147 | A1 | 1/2009 | Behling | |
| 2010/0260883 | A1 * | 10/2010 | Schnabl | B29C 47/0847 425/331 |
| 2011/0063939 | A1 * | 3/2011 | Padmanabhan | B01F 15/00928 366/79 |
| 2011/0069576 | A1 * | 3/2011 | Padmanabhan | B01F 15/00928 366/89 |
| 2016/0214304 | A1 * | 7/2016 | Scheel | B29C 47/0847 |

FOREIGN PATENT DOCUMENTS

| | | | | |
|---|---|---|---|---|
| DE | | 3116170 A1 * | 11/1982 | ......... B29C 47/0847 |
| DE | | 39 42 350 | 10/1990 | |
| EP | | 0 426 101 | 5/1991 | |
| EP | | 2 017 062 | 1/2009 | |
| WO | | WO 86/02313 | 4/1986 | |
| WO | | 2017/035919 | * 3/2017 | |

OTHER PUBLICATIONS

K-M Hess: "Fortschritte beim Herstellen gefüllter Kunststoffe", Kunstoffe, Carl Falser Verlag, München, DE, vol. 73, No. 6, Jun. 1, 1983, pp. 282-286, ISSN: 0023-5563.
Chinese Search Report dated Jan. 12, 2017 with respect to counterpart Chinese patent application 201480051446.5
Translation of Chinese Search Report dated Jan. 12, 2017 with respect to counterpart Chinese patent application 201480051446.5.

* cited by examiner

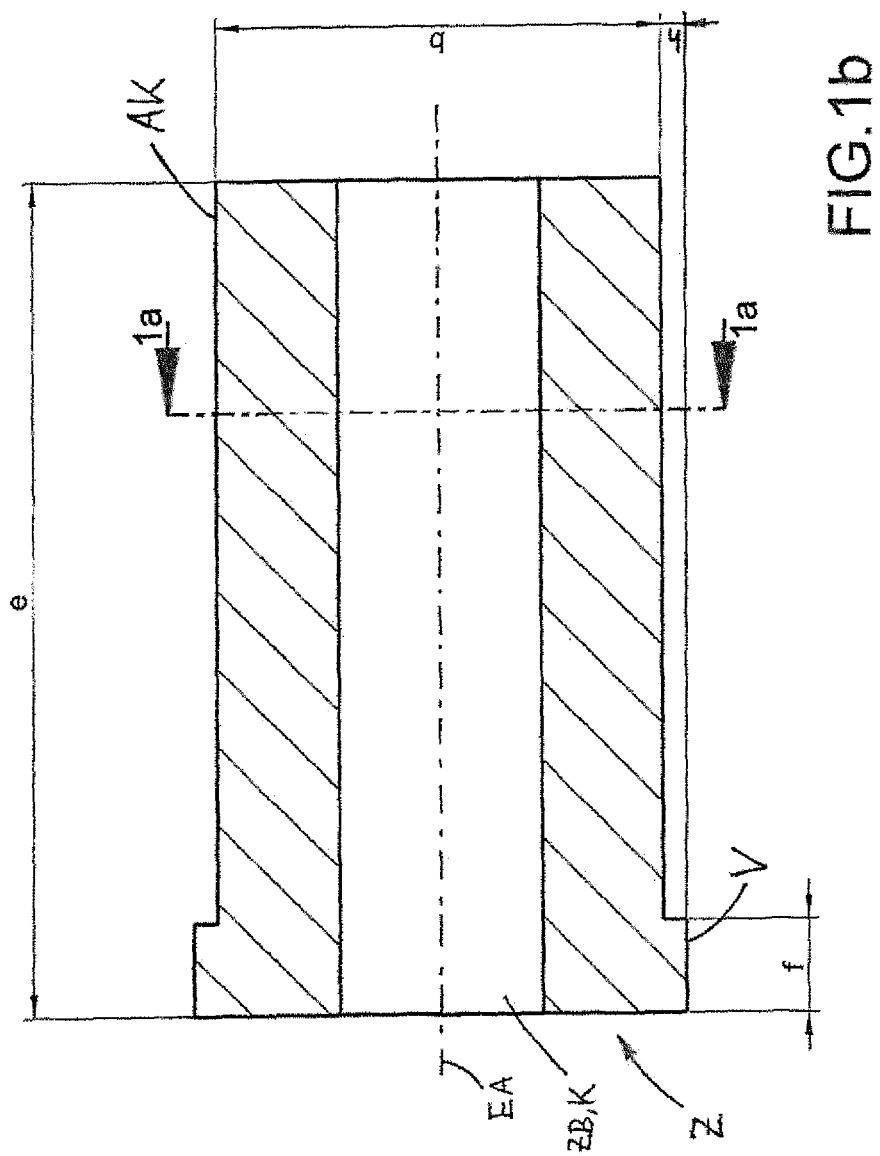

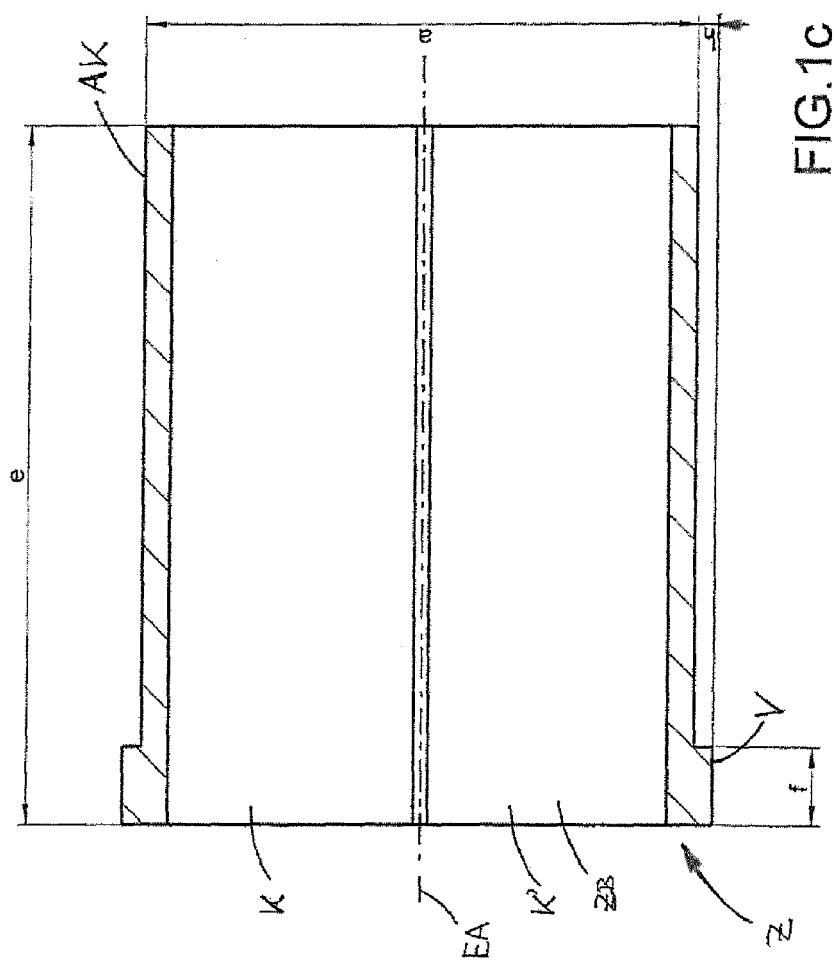

WEARING BODY FOR RECEIVING A TWIN SCREW FOR EXTRUDING MELTABLE MATERIAL

The invention relates to a wearing body having an axial twin borehole for receiving a twin screw for extruding meltable material, in particular plastic. The invention also relates to a housing body complementary to the wearing body and also to an extrusion cylinder for a twin-screw extruder having such a wearing body and/or housing body and also to a twin-screw extruder having such an extrusion cylinder.

In operation, twin screws cause a high degree of wear on the material of the twin borehole surrounding them. So as not to have to regularly replace the entire extrusion cylinder, instead of applying the twin borehole directly in the extrusion cylinder, a wearing body, also designated a bushing, is provided with the twin borehole and is inserted into the extrusion cylinder. When the material of the twin borehole is thus abraded accordingly, only the wearing body, but not the entire extrusion cylinder, has to be replaced. Known wearing bodies with a circular, rectangular or stadium-shaped (two semicircles, which are connected by straight lines) cross-section tend, under load, to form cracks, through which for example cooling water can emerge, and/or require a high cost of materials.

The invention is therefore based on the problem of providing such a wearing body having greater stability and, at the same time having lower material requirements.

This problem is solved by a wearing body having the features according to Claim 1. Advantageous further developments are described in the subclaims.

The invention is based on the idea of providing a wearing body in the form of a straight cylinder with an axial twin borehole and with an oval radial cross-section. The outer contour of the radial cross-section is convexly curved over the entire circumference and the width of the oval on a first axis of symmetry is greater than the height of the oval on a second axis of symmetry, wherein the axes of symmetry run perpendicularly to one another and their point of intersection lies on the extrusion axis.

The second axis of symmetry preferably runs between the two, in particular parallel, channels or respectively bores of the twin borehole, i.e. along the overlapping region of the channels, in which the screws engage into one another.

Preferably, the ratio of the width of the oval to the height of the oval lies between 1.3 and 1.6.

Furthermore, it is preferred that the oval has four circular arcs, and namely two first circular arcs symmetrical to the first axis of symmetry and two second circular arcs symmetrical to the second axis of symmetry, wherein the radius of the first circular arcs lies on the second axis of symmetry and the radius of the second circular arcs lies on the first axis of symmetry.

In a preferred configuration, the radius of the first circular arcs is greater than the radius of the second circular arcs. Preferably, the ratio of the radius of the first circular arcs to the radius of the second circular arcs lies between 2.3 and 3.5. It is further preferred that the ratio of the radius of the second circular arcs to the radius of the channels of the twin borehole is preferably between 1.25 and 1.55. Preferably, the radius of the first circular arcs intersects the first axis of symmetry.

In a preferred configuration, the four circular arcs form a closed oval, i.e. the four circular arcs directly adjoin one another alternately, so that their radii lie on one another at the contact points of the circular arcs. It is preferred here that the angle of their radii, lying on another, to the second axis of symmetry lies respectively between 15° and 25°. In other words, the angle between the second axis of symmetry and an axis running through the centre point of the first circular arcs and through the centre point of the second circular arcs, lies between 15° and 25°.

The centre point of the second circular arcs, wherein the radius extends, as is known, from the centre point to the circumference, can lie at various positions along the first axis of symmetry. In a preferred configuration, the centre point of the second circular arcs lies respectively on the centre point of the channels of the twin borehole, in particular on the same side of the second axis of symmetry.

In a further preferred configuration, the oval is an ellipse, wherein the main axis of the ellipse lies on the first axis of symmetry and the secondary axis of the ellipse lies on the second axis of symmetry. In this case, the diameter of the first circular arcs corresponds to the height of the oval and the diameter of the second circular arcs corresponds to the width of the oval. According to the definition of an ellipse, circular arcs are punctiform in the apexes of the ellipse and are connected by an elliptical path.

Further configurations are possible, in which the oval has elliptical and non-elliptical sections.

It is, furthermore, preferred, that the cylinder has a radial projection at an axial end. The projection is directed outward from the extrusion axis, and therefore increases the cross-section. The projection can be provided completely circumferentially or in segments, at least one segment. The radial height of the projection can be constant or variable. This projection increases the stability of the cylinder and enables an axial securing of the wearing body in the housing surrounding it.

With the configuration of the wearing body according to the invention, not only is a greater stability achieved and cracking is avoided, but also the cost of materials is reduced.

The invention is explained in further detail below with the aid of example embodiments and with reference to the drawings.

FIG. 1b shows the oval wearing body according to FIG. 1a in the section view taken along section line 1b-1b in FIG. 1a along an axis of symmetry.

FIG. 1c shows the oval wearing body according to FIG. 1a in the section view taken along section line 1c-1c in FIG. 1a along another axis of symmetry.

In the following embodiments, symmetrical elements and reference numbers are to be read together, even if not specified explicitly everywhere.

Figure 1A:
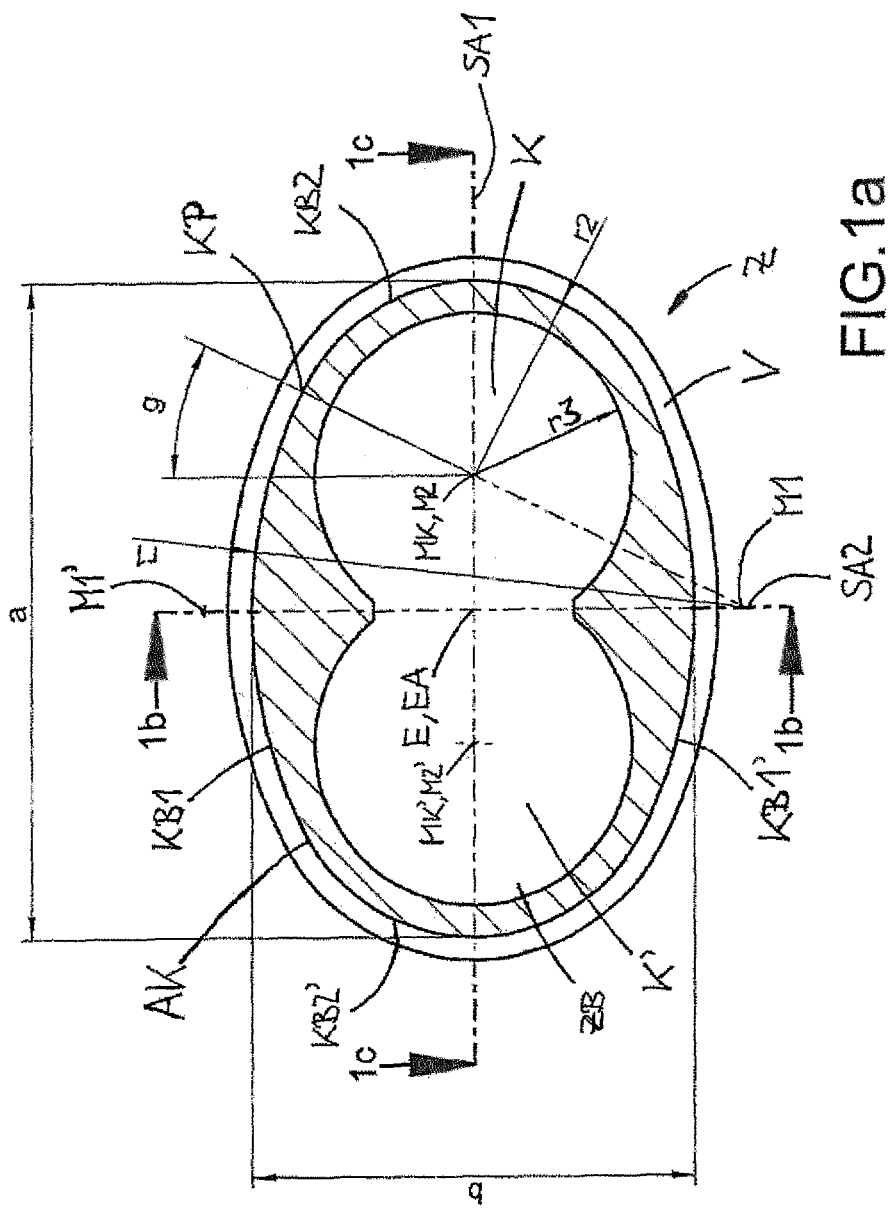
FIG. 1a shows an oval wearing body in a radial cross-sectional view taken along section line 1a-1a in FIG. 1b.

FIG. 1a shows the radial cross-section of an oval wearing body according to the first example embodiment. The wearing body is configured axially as a straight cylinder Z and has an axial twin borehole ZB with two axial channels or respectively bores K, K'. The twin borehole ZB is axially symmetrical to a first axis of symmetry SA1 and to a second axis of symmetry SA2. The first axis of symmetry SA1 and the second axis of symmetry SA2 stand perpendicularly to one another and their point of intersection E lies on the extrusion axis EA. The second axis of symmetry SA2 runs between the channels K, K'. The channels K, K' have respectively a radius r3, which extends from their respective centre point MK, MK' to their circumference.

The radial cross-section of the cylinder Z has an outer contour AK, convexly curved over the entire circumference of the cylinder Z, with two first circular arcs KB1, KB1' and two second circular arcs KB2, KB2'. The first circular arcs KB1, KB1' are axially symmetrical to the first axis of symmetry SA1. The second circular arcs KB2, KB2' are axially symmetrical to the second axis of symmetry SA2.

The first circular arcs KB1, KB1' have a radius R1, which extends from their respective centre point M1, M1' up to their circumference on the outer contour AK. The centre points M1, M1' of the first circular arcs KB1, KB1' lie on the second axis of symmetry SA2.

The second circular arcs KB2, KB2' have a radius r2, which extends from their respective centre point M2, M2' up to their circumference on the outer contour AK. The centre points M2, M2' of the second circular arcs KB2, KB2' lie on the first axis of symmetry SA1.

The radius r1 of the first circular arcs KB1, KB1' is greater than the radius r2 of the second circular arcs. The radius r1 of the first circular arcs KB1, KB1' intersects the first axis of symmetry SA1.

The first circular arcs KB1, KB1' and the second circular arcs KB2, KB2' directly adjoin one another alternately and form a closed oval. At the contact points KP of the respective circular arcs, their radii r1, r2 lie on one another, i.e. the centre points M1, M1' of the first circular arcs KB1, KB1', the centre points M2, M2' of the second circular arcs KB2, KB2' and the respective contact points KP form an axis. This axis and the second axis of symmetry SA2 span the angle g.

In this example embodiment, the centre points M2, M2' of the second circular arcs KB2, KB2' lie respectively on the centre points MK, MK' of the channels K, K'. In alternative example embodiments, the centre points of the channels and the centre points of the second circular arcs are not congruent.

The cylinder Z has a radial width a along the first axis of symmetry SA1 and a radial height b along the second axis of symmetry SA2. The radial width a is greater than the radial height b.

The cylinder Z has at an axial end a radially outwardly directed projection V. In this example embodiment, the projection V extends over the entire circumference of the cylinder Z. In alternative example embodiments, no projection is provided, or a projection is only provided in sections and/or a variable height of the projection is provided.

FIG. 1b shows the wearing body according to the first example embodiment in the sectional view taken along section line 1b-1b of FIG. 1a, and FIG. 1c shows the wearing body according to the first example embodiment in the section view taken along section line 1c-1c of FIG. 1a. FIGS. 1b and 1c show that the cylinder Z has an axial length e, whilst the projection V has a shorter axial length f. The projection V has, in addition, a radial height h.

Figure 2A:
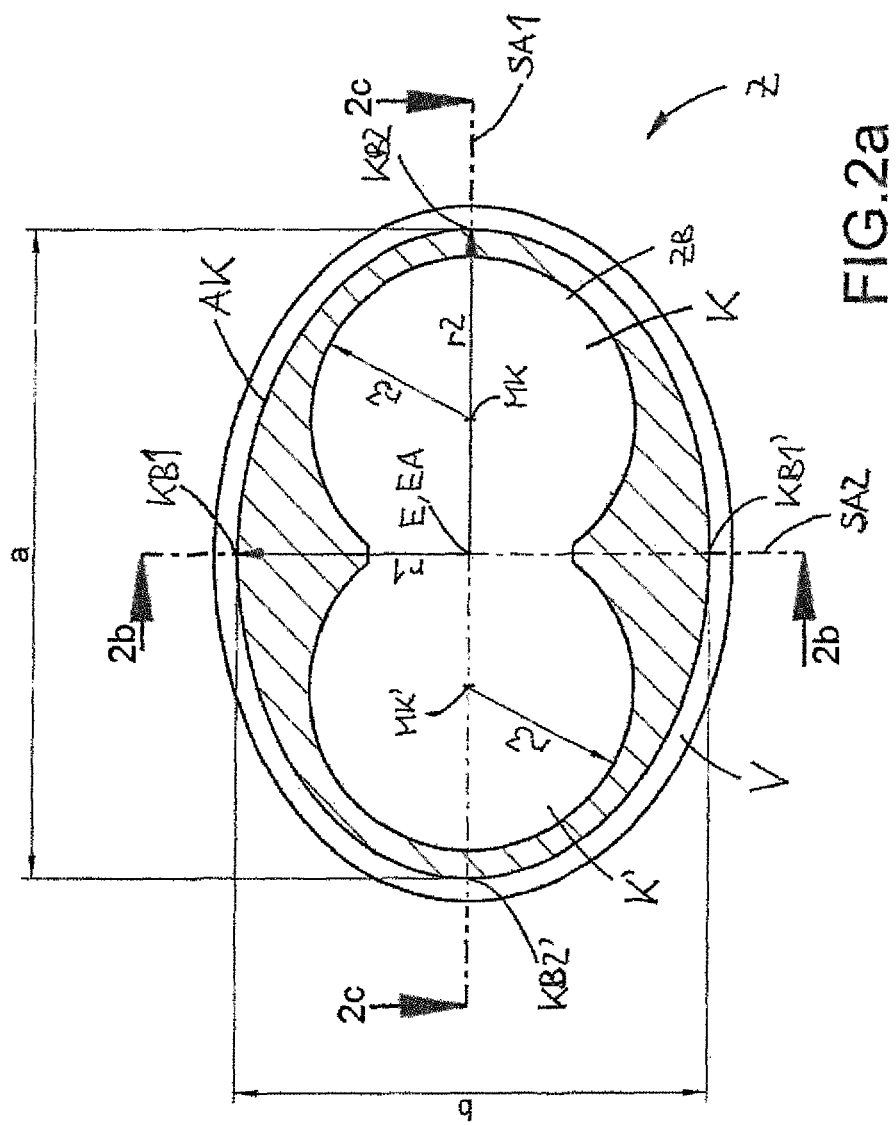
FIG. 2a shows an elliptical wearing body in a radial cross-sectional view taken along section line 2a-2a in FIG. 2b.
Figure 2B:
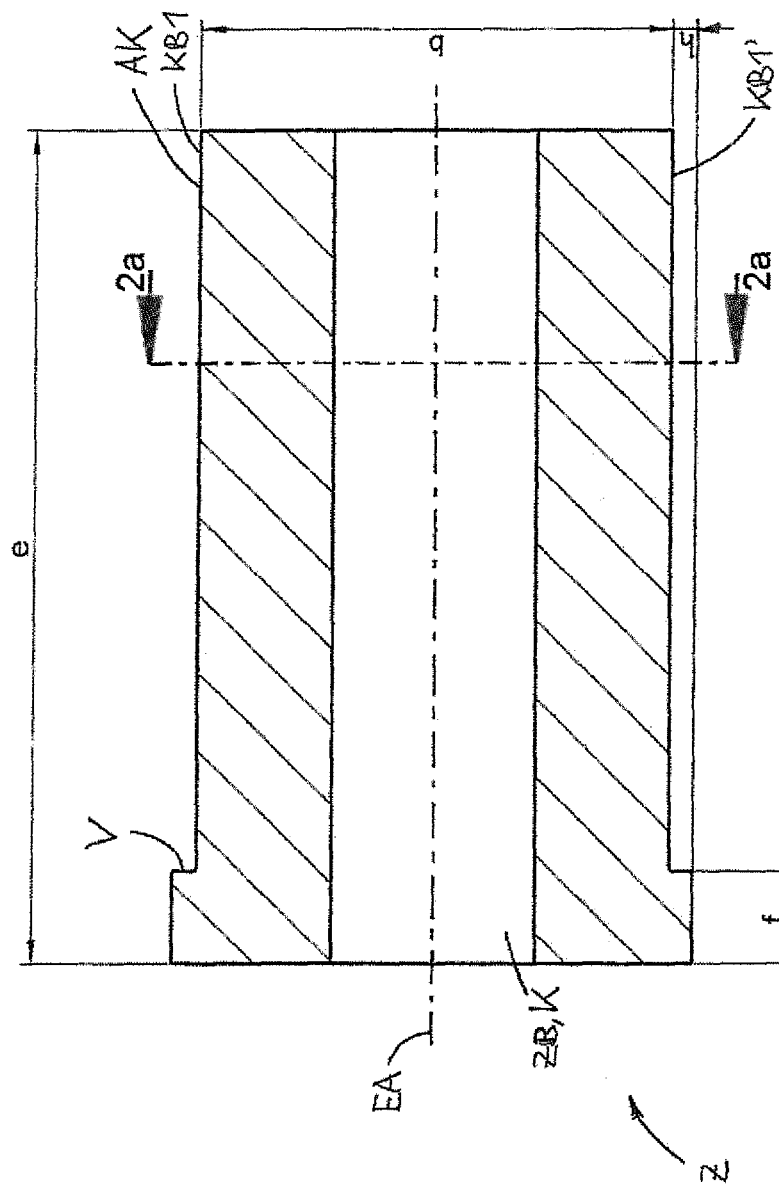
FIG. 2b shows the elliptical wearing body according to FIG. 2a in the section view taken along section line 2b-2b in FIG. 2a along an axis of symmetry.
Figure 2C:
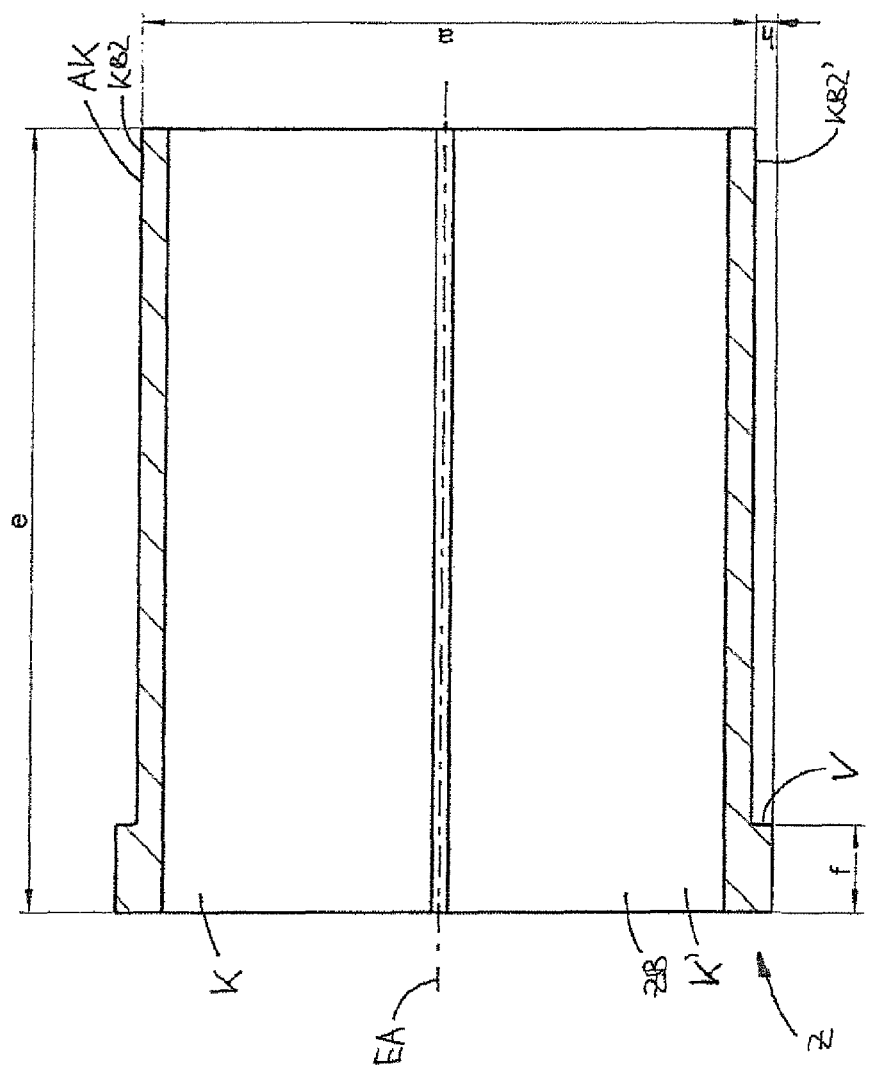
FIG. 2c shows the elliptical wearing body according to FIG. 2a in the section view taken along section line 2c-2c in FIG. 2a along another axis of symmetry.

FIGS. 2a, 2b and 2c show a wearing body according to a second example embodiment of the invention. Identical elements are given therein the same reference numbers as in the first example embodiment (FIGS. 1a, 1b and 1c). The explanations with regard to the first example embodiment also apply to the second example embodiment, in so far as they do not contradict the following explanations.

In this example embodiment, the cylinder Z has an elliptical cross-section. Consequently, the first and second circular arcs KB1, KB1', KB2, KB2' are respectively arranged in a punctiform manner in the apexes of the ellipse and are connected with one another by an elliptical path. The main axis of the ellipse lies on the first axis of symmetry SA1. The secondary axis of the ellipse lies on the second axis of symmetry SA2. The first circular arcs KB1, KB1 lie on a circle, the diameter of which corresponds to the radial height b of the cylinder Z. The second circular arcs KB2, KB2' likewise lie on a circle, the diameter of which corresponds to the radial width a of the cylinder Z. In this example embodiment, the radius r2 of the second circular arcs KB2, KB2' is greater than the radius r1 of the first circular arcs KB1, KB1'.

The example embodiments are respectively supplemented by a housing body, complementary to the wearing body, an extrusion cylinder with a corresponding wearing body and/or housing body and a twin-screw extruder with a corresponding extrusion cylinder (not illustrated).

LIST OF REFERENCE SIGNS

Z cylinder
e length of the cylinder
ZB twin borehole
K, K' channels of the twin borehole
AK outer contour
SA1 first axis of symmetry
SA2 second axis of symmetry
E point of intersection of the axes of symmetry
EA extrusion axis
a radial width of the oval/cylinder
b radial height of the oval/cylinder
KB1, KB1' first circular arcs
KB2, KB2' second circular arcs
r1 radius of the first circular arcs
r2 radius of the second circular arcs
r3 radius of the channels of the twin borehole
KP contact point of the respective circular arcs
MK, MK' centre point of the channels of the twin borehole
M1, M1' centre point of the first circular arcs
M2, M2' centre point of the second circular arcs
g angle of the axis through the respective centre points of the first and second circular arcs to the second axis of symmetry SA2
V radial projection
f length of the projection
h height of the projection

The invention claimed is:

1. A wearing body in the form of a straight cylinder having an axial twin borehole configured to receive a twin screw for extruding meltable material, said cylinder comprising a radial cross-section having an outer contour which is convexly curved over an entire circumference and configured in the form of an oval, and first and second axes of symmetry which extend in perpendicular relationship to one another and define a point of intersection which lies on an extrusion axis, said oval defined by a width on the first axis of symmetry and a height on the second axis of symmetry, said width on the first axis of symmetry being greater than the height on the second axis of symmetry, said oval including two first circular arcs each in symmetric relationship to the first axis of symmetry, and two second circular arcs each in symmetric relationship to the second axis of symmetry, said first circular arcs being defined by a radius which lies on the second axis of symmetry, and said second circular arcs being defined by a radius which lies on the first axis of symmetry, said two first circular arcs and said two second circular arcs forming a closed oval, so that at contact points of the first and second circular arcs their radii lie respectively on one another, wherein the radii of the first and second circular arcs, lying on one another, define an angle to the second axis of symmetry, said angle lying between 15° and 25°.

2. The wearing body of claim 1, wherein the twin borehole defines two channels, said second axis of symmetry extending between the two channels of the twin borehole.

3. The wearing body of claim 1, wherein a ratio of the width of the oval to the height of the oval lies between 1.3 and 1.6.

4. The wearing body of claim 1, wherein the radius of the first circular arcs is greater than the radius of the second circular arcs.

5. The wearing body of claim 1, wherein a ratio of the radius of the first circular arcs to the radius of the second circular arcs lies between 2.3 and 3.5.

6. The wearing body of claim 1, wherein the twin borehole defines two channels defined by a radius, wherein a ratio of the radius of the second circular arcs to the radius of the channels of the twin borehole lies between 1.25 and 1.55.

7. The wearing body of claim 1, wherein the twin borehole defines two channels, said second circular arcs defining centre points which lie on centre points of the channels of the twin borehole.

8. The wearing body of claim 1, wherein the oval is an ellipse.

9. The wearing body of claim 1, wherein the cylinder has a radial projection at an axial end.

10. An extrusion cylinder for a twin-screw extruder, said extrusion cylinder comprising:
a wearing body in the form of a straight cylinder having an axial twin borehole configured to receive a twin screw for extruding meltable material, said cylinder comprising a radial cross-section having an outer contour which is convexly curved over an entire circumference and configured in the form of an oval, and first and second axes of symmetry which extend in perpendicular relationship to one another and define a point of intersection which lies on an extrusion axis, said oval defined by a width on the first axis of symmetry and a height on the second axis of symmetry, said width on the first axis of symmetry being greater than the height on the second axis of symmetry, said oval including two first circular arcs each in symmetric relationship to the first axis of symmetry, and two second circular arcs each in symmetric relationship to the second axis of symmetry, said first circular arcs being defined by a radius which lies on the second axis of symmetry, and said second circular arcs being defined by a radius which lies on the first axis of symmetry, said two first circular arcs and said two second circular arcs forming a closed oval, so that at contact points of the first and second circular arcs their radii lie respectively on one another, wherein the radii of the first and second circular arcs, lying on one another, define an angle to the second axis of symmetry, said angle lying between 15° and 25°.

11. An extruder, comprising a twin screw, an extrusion cylinder which includes a wearing body in the form of a straight cylinder having an axial twin borehole which receives the twin screw for extruding meltable material, said cylinder comprising a radial cross-section having an outer contour which is convexly curved over an entire circumference and configured in the form of an oval, and first and second axes of symmetry which extend in perpendicular relationship to one another and define a point of intersection which lies on an extrusion axis, said oval defined by a width on the first axis of symmetry and a height on the second axis of symmetry, said width on the first axis of symmetry being greater than the height on the second axis of symmetry, said oval including two first circular arcs each in symmetric relationship to the first axis of symmetry, and two second circular arcs each in symmetric relationship to the second axis of symmetry, said first circular arcs being defined by a radius which lies on the second axis of symmetry, and said second circular arcs being defined by a radius which lies on the first axis of symmetry, said two first circular arcs and said two second circular arcs forming a closed oval, so that at contact points of the first and second circular arcs their radii lie respectively on one another, wherein the radii of the first and second circular arcs, lying on one another, define an angle to the second axis of symmetry, said angle lying between 15° and 25°.

* * * * *